(12) United States Patent
Dai et al.

(10) Patent No.: US 12,105,199 B2
(45) Date of Patent: Oct. 1, 2024

(54) SYSTEM AND METHOD FOR MEASURING IMAGE DISTANCE OF POWER TRANSMISSION LINES WITH UNMANNED AERIAL VEHICLE (UAV)

(71) Applicants: State Grid Jiangsu Taizhou Power Supply Company, Jiangsu (CN); Allcorehatress (Beijing) Technology Co., Ltd., Beijing (CN)

(72) Inventors: Yongdong Dai, Jiangsu (CN); Jianguang Yao, Jiangsu (CN); Feng Mao, Jiangsu (CN); Maofei Wang, Jiangsu (CN); Wanjin Yu, Beijing (CN); Beibei Weng, Jiangsu (CN); Ling Ju, Jiangsu (CN); Zhongjun Jiang, Jiangsu (CN); Xinlian Bu, Jiangsu (CN); Weihao Fan, Jiangsu (CN); Ze Zhang, Jiangsu (CN); Xingchun Xu, Jiangsu (CN)

(73) Assignees: State Grid Jiangsu Taizhou Power Supply Company, Taizhou (CN); Allcorehatress (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/765,849

(22) PCT Filed: Dec. 30, 2021

(86) PCT No.: PCT/CN2021/143374
§ 371 (c)(1),
(2) Date: Apr. 1, 2022

(87) PCT Pub. No.: WO2022/170878
PCT Pub. Date: Aug. 18, 2022

(65) Prior Publication Data
US 2024/0053477 A1    Feb. 15, 2024

(30) Foreign Application Priority Data

Feb. 9, 2021   (CN) .......................... 202110177572.7

(51) Int. Cl.
*G01S 17/86*   (2020.01)
*B64U 10/13*   (2023.01)
(Continued)

(52) U.S. Cl.
CPC .............. *G01S 17/86* (2020.01); *G01S 17/42* (2013.01); *G01S 17/894* (2020.01);
(Continued)

(58) Field of Classification Search
CPC ........ G01S 17/86; G01S 17/42; G01S 17/894; G01S 17/933; G01S 17/08; G01S 19/42;
(Continued)

(56) References Cited

U.S. PATENT DOCUMENTS

| | | | |
|---|---|---|---|
| 2018/0357788 A1* | 12/2018 | Li | .............. G06T 5/70 |
| 2019/0287263 A1* | 9/2019 | Kerby | ...................... G06T 7/62 |

(Continued)

FOREIGN PATENT DOCUMENTS

| | | | | |
|---|---|---|---|---|
| CN | 108932475 A | | 12/2018 | |
| CN | 109254303 A | | 1/2019 | |
| CN | 110889829 A | * | 3/2020 | ............. G06N 3/045 |

OTHER PUBLICATIONS

English translation of Zuo et al. (CN 110889829) (Year: 2020).*
(Continued)

*Primary Examiner* — James M McPherson
*Assistant Examiner* — Kyle J Kingsland

(57) ABSTRACT

A system and method for measuring an image distance of power transmission lines with an unmanned aerial vehicle (UAV). The system includes: a UAV, a master console, and a plurality of cameras. The cameras are configured to collect (Continued)

2D image data of a power transmission line corridor. The UAV includes a vehicle body, a lidar device, a rotor assembly, a power unit, a flight control processor, a state detection device, and a wireless communication module. The lidar device is configured to collect 3D point cloud data of the power transmission lines. The master console is configured to receive the 2D image data and the 3D point cloud data, and establish a mapping relationship between the 2D image data and the 3D point cloud data; recognize a target object, determine 3D point coordinates of the target object, and calculate a distance from the target object to the power transmission lines.

8 Claims, 5 Drawing Sheets

(51) Int. Cl.
*B64U 101/00* (2023.01)
*G01S 17/42* (2006.01)
*G01S 17/894* (2020.01)
*G01S 17/933* (2020.01)
*G06T 7/73* (2017.01)
*G06V 20/52* (2022.01)

(52) U.S. Cl.
CPC .............. *G01S 17/933* (2013.01); *G06T 7/73* (2017.01); *G06V 20/52* (2022.01); *B64U 10/13* (2023.01); *B64U 2101/00* (2023.01); *G06T 2207/10028* (2013.01)

(58) Field of Classification Search
CPC . G06T 7/73; G06T 2207/10028; G06V 20/52; G01C 11/00; G01C 11/04
See application file for complete search history.

(56) References Cited

U.S. PATENT DOCUMENTS

2020/0318962 A1* 10/2020 Gold ...................... G01C 15/00
2021/0209793 A1* 7/2021 Ishii ....................... H04N 23/60

OTHER PUBLICATIONS

Jrtaylor, ("XML Interpretation of Agisoft Photoscan/Mateshape Camera Parameters"), Programmer Group, Apr. 20, 2019 (Year: 2019).*

* cited by examiner

SYSTEM AND METHOD FOR MEASURING IMAGE DISTANCE OF POWER TRANSMISSION LINES WITH UNMANNED AERIAL VEHICLE (UAV)

TECHNICAL FIELD

The present disclosure relates to the technical field of unmanned aerial vehicles (UAVs), and in particular, to a system and a method for measuring an image distance of power transmission lines with a UAV.

BACKGROUND

The traditional ranging method for power transmission lines is manual laser ranging from the ground. An inspector uses a handheld laser rangefinder to measure a distance between a target object and a power transmission line. The basic principle of this method is to calculate the distance according to the speed of light and the atmospheric refraction coefficient based on a flight time of light. With the development of the LIDAR technology, the commonly used power transmission line measurement tool is a laser scanner. The laser scanner can realize three-dimensional (3D) restoration of a power transmission line corridor scene in a large area, to achieve distance measurement between any observation targets within the scanning range. The laser scanner has a working principle similar to that of the handheld laser rangefinder, and also obtains spatial coordinate information of the target with the help of the flight time of light, thereby calculating a Euclidean spatial distance between targets.

The measurement method of the traditional handheld laser rangefinder is susceptible to interference and influence from human as well as environmental factors. For example, in areas with more sunny days, the infrared rays contained in strong sunlight can cause large measurement errors in handheld laser rangefinders used outdoors; in rainy and snowy weather conditions, rain can also affect the reflection of the laser beam, causing the measurement device to fail to work properly; at the same time, human-induced target positioning inaccuracy can also bring errors to the measurement. The power transmission line measurement method based on the laser scanner has high accuracy and is barely affected by human factors, but it is also affected by rain and snow, and this method requires higher operation cost and larger data volume. The above two measurement methods also have the same deficiency, that is, they cannot implement all-weather and all-day transmission line monitoring due to the costs of manpower and actual field operation. When an actual operation scenario is consistent with an acquisition scenario of original data, the original data obtained by the above two methods have certain reference value and validity. However, when the actual measurement scenario is different from the data acquisition scenario, for example, when a new target appears in the scenario, it is difficult to implement distance measurement between the new target object and the power transmission lines based on the original data.

SUMMARY

The present disclosure provides a system and method for measuring an image distance of power transmission lines with a UAV, which can implement all-weather, all-day monitoring for power transmission lines, so that an obtained distance measurement value is more accurate.

A system for measuring an image distance of power transmission lines with a UAV is provided, wherein the power transmission lines include a plurality of electrical power towers and a power transmission line corridor between adjacent electrical power towers, and the system includes a UAV, a master console, and a plurality of cameras;

the cameras are fixed on the electrical power towers, and are configured to collect two-dimensional (2D) image data of the power transmission line corridor;

the UAV includes a vehicle body, a lidar device, a rotor assembly, a power unit, a flight control processor, a state detection device, and a wireless communication module;

the state detection device is configured to acquire positioning information of the state detection device, collect distance information between the UAV and ground, and send the positioning information and the distance information to the flight control processor; the flight control processor is configured to generate a control signal according to the distance information and the positioning information, and control, according to the control signal, the power unit to adjust a flight track and a flight height of the UAV; the lidar device is configured to collect 3D point cloud data of the power transmission lines, wherein the 3D point cloud data is sent to the master console through the wireless communication module;

the master console is configured to receive the 2D image data and the 3D point cloud data, and establish a mapping relationship between the 2D image data and the 3D point cloud data according to interior orientation elements of the camera and exterior orientation elements of the 2D image data in a 3D space; recognize a target object according to the 2D image data, determine 3D point coordinates of the target object according to the mapping relationship, and calculate a distance from the target object to the power transmission lines according to the 3D point coordinates of the target object; and Further, the state detection device includes: a GPS positioning device and a laser ranging radar, the GPS positioning device is configured to acquire positioning information of the UAV, and the laser ranging radar is configured to detect a height from the UAV to the ground.

Further, a width of the power transmission line corridor is greater than or equal to 50 meters.

Further, the flight control processor is further configured to receive, through the wireless communication module, a ground control signal sent by the master console, and control, according to the ground control signal, the power unit to adjust the flight track and the flight height of the UAV, wherein a priority of the ground control signal is higher than that of the control signal.

A method for measuring an image distance of power transmission lines using the foregoing system is provided, including the following steps:

receiving, by the master console, 2D image data and 3D point cloud data;

establishing a mapping relationship between the 2D image data and the 3D point cloud data according to interior orientation elements of the camera and exterior orientation elements of the 2D image data in a 3D space;

recognizing a target object according to the 2D image data, and determining 3D point coordinates of the target object according to the mapping relationship; and calculating a distance from the target object to the power transmission lines according to the 3D point coordinates of the target object.

Further, the establishing the mapping relationship between the 2D image data and the 3D point cloud data according to the interior orientation elements of the camera and the exterior orientation elements of the 2D image data in a 3D space includes:

selecting a first frame from the 2D image data as a background image;

selecting feature objects from the background image and the 3D point cloud data;

establishing a transformation relationship between coordinates by the interior orientation elements of the camera, 2D pixel coordinates of the feature objects in the background image, and 3D space coordinates of the feature objects in the 3D point cloud data;

calculating a rotation matrix and a translation vector in the transformation relationship; and calculating, according to the transformation relationship, 3D coordinates in the 3D point cloud data that correspond to coordinates of each pixel in the background image, and obtaining a mapping relationship between the 2D image data and the 3D point cloud data.

Further, the transformation relationship is as follows:

$$\begin{bmatrix} u \\ v \\ 1 \end{bmatrix} = \begin{bmatrix} \frac{1}{d_x} & 0 & u_0 \\ 0 & \frac{1}{d_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} X_W \\ Y_W \\ Z_W \\ 1 \end{bmatrix}$$

wherein $d_x$ and $d_y$ represent physical dimensions of each pixel on a horizontal axis x and a vertical axis y of the 2D image data, $(u_0, v_0)$ is pixel coordinates of an intersection between an optical axis of the camera and a 2D image data plane, f represents a focal length of the camera, (u, v) is 2D pixel coordinates, and $(X_W, Y_W, Z_W)$ is 3D space coordinates; R represents a rotation matrix between a 2D pixel coordinate system and a 3D space coordinate system, and T represents a translation vector from the 2D pixel coordinate system to the 3D space coordinate system; and the interior orientation elements of the camera include the pixel coordinates of the intersection between the optical axis of the camera and the 2D image data plane and the focal length of the camera.

Further, the determining the 3D point coordinates of the target object according to the mapping relationship includes:

selecting any pixel of the target object, and searching for 3D point coordinates corresponding to the pixel according to the mapping relationship.

Further, after the determining the 3D point coordinates of the target object according to the mapping relationship, the method further includes:

searching for 3D point coordinates of a power transmission line closest to the target object from the 3D point cloud data of the power transmission lines, and calculating a Euclidean distance from the target object to the closest power transmission line according to the 3D point coordinates of the target object and the 3D point coordinates of the closest power transmission line.

Further, after the recognizing the target object according to the 2D image data, the method further includes:

framing the target object with a box, and obtaining pixel coordinate values of any two diagonal angles of the box;

calculating a pixel coordinate value of another angle at the bottom of the box according to the pixel coordinate values of the two diagonal angles, obtaining 3D point coordinates corresponding to two base angles at the bottom of the box according the mapping relationship, and calculating a Euclidean distance between the two base angles;

dividing the Euclidean distance between the two base angles by a pixel distance between the two base angles, obtaining a space size corresponding to each pixel of the box, and calculating a spatial distance value between a top angle of the box and the base angle on the same side;

on the basis of the 3D point coordinates of the two base angles, adding the spatial distance value on the Z axis, to obtain 3D point coordinates of two top angles of the box; and calculating Euclidean distances from the two top angles to a 3D point of a closest power transmission line according to the 3D point coordinates of the two top angles respectively, and using a smaller distance value as a distance from the target object to the power transmission lines.

In the system and method for measuring an image distance of power transmission lines with a UAV, a mapping relationship between 2D image data and 3D point cloud data is established, and according to the mapping relationship, 3D point coordinates in a 3D space that correspond to a target object in the 2D image data are determined, so that a distance from the target object to the power transmission lines is calculated with high accuracy. The distance of the target object in the entire power transmission line corridor can be monitored through cameras, realizing all-weather, all-day monitoring for the power transmission lines.

DETAILED DESCRIPTION

For a better understanding of the foregoing technical solution, the following describes the foregoing technical solution in detail with reference to the accompanying drawings and specific implementations.

EMBODIMENT 1

Figure 1:
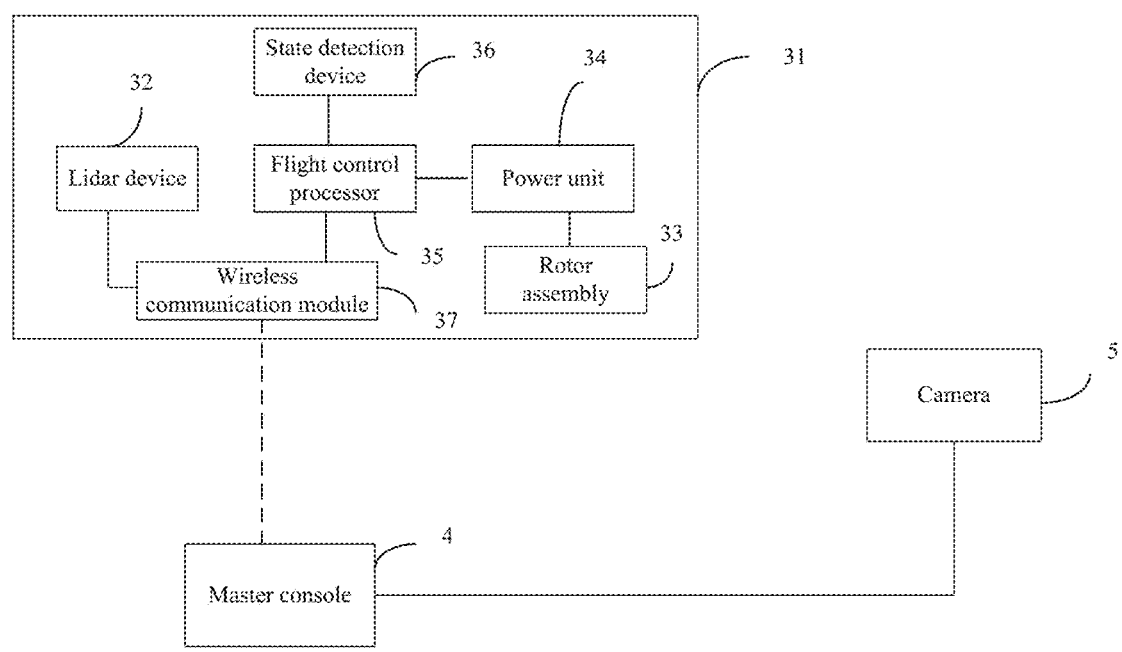
FIG. 1 is a schematic structural diagram of an embodiment of a power transmission line corridor in a system for measuring an image distance of power transmission lines with a UAV according to the present disclosure.
Figure 2:
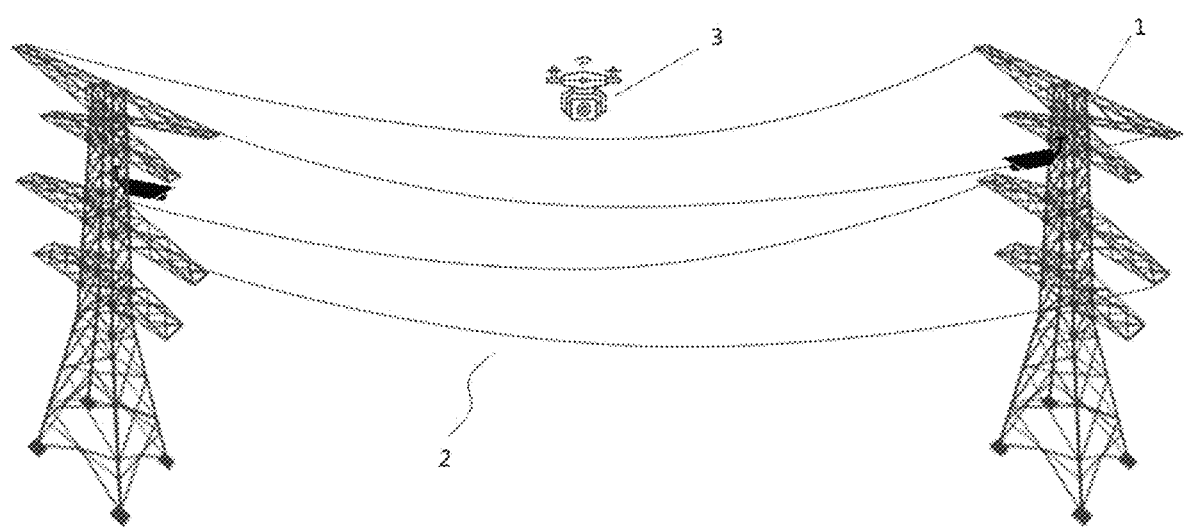
FIG. 2 is a schematic structural diagram of an embodiment of a system for measuring an image distance of power transmission lines with a UAV according to the present disclosure.

Referring to FIG. 1 and FIG. 2, in some embodiments, a system for measuring an image distance of power transmission lines with a UAV is provided. The power transmission lines include a plurality of electrical power towers 1 and a power transmission line corridor 2 located between adjacent electrical power towers. The system includes a UAV 3, a master console 4 and a plurality of cameras 5.

The cameras 5 are fixed on the electrical power towers 1, and are configured to collect 2D image data of the power transmission line corridor.

The UAV 3 includes a vehicle body 31, a lidar device 32, a rotor assembly 33, a power unit 34, a flight control processor 35, a state detection device 36, and a wireless communication module 37.

The state detection device 36 is configured to acquire positioning information of the state detection device, collect distance information between the UAV and ground, and send the positioning information and the distance information to the flight control processor 35; the flight control processor 35 is configured to generate a control signal according to the distance information and the positioning information, and control, according to the control signal, the power unit 34 to adjust a flight track and a flight height of the UAV; the lidar device 32 is configured to collect 3D point cloud data of the power transmission lines, wherein the 3D point cloud data is sent to the master console 4 through the wireless communication module 37.

The master console 4 is configured to receive the 2D image data and the 3D point cloud data, and establish a mapping relationship between the 2D image data and the 3D point cloud data according to interior orientation elements of the camera and exterior orientation elements of the 2D image data in a 3D space; recognize a target object according to the 2D image data, determine 3D point coordinates of the target object according to the mapping relationship, and calculate a distance from the target object to the power transmission lines according to the 3D point coordinates of the target object.

Further, the state detection device 36 includes: a GPS positioning device and a laser ranging radar, the GPS positioning device is configured to acquire positioning information of the UAV, and the laser ranging radar is configured to detect a height from the UAV to the ground.

Further, the rotor assembly 33 includes at least one rotor. The power unit 34 includes at least one motor, of which the quantity is the same as that of the at least one rotor. The flight control processor 35 is configured to control a rotation speed and direction of the related motor, thereby controlling the flight attitude of the UAV, and adjusting a flight track and a flight height of the UAV.

Further, a width of the power transmission line corridor is greater than or equal to 50 meters.

Further, the flight control processor 35 is further configured to receive, through the wireless communication module 37, a ground control signal sent by the master console 4, and control, according to the ground control signal, the power unit 34 to adjust the flight track and the flight height of the UAV, wherein a priority of the ground control signal is higher than that of the control signal.

Specifically, the master console 4 sends the ground control signal through the wireless communication module 37. After receiving the ground control signal, the flight control processor 35 controls the rotation speed and direction of the related motor in the power unit 34 according to the ground control signal, so that the UAV flies according to a preset flight track, and the flight attitude can also be adjusted according to the distance to the ground and the location information of the UAV during the flight.

In the system for measuring an image distance of power transmission lines with a UAV, 3D point cloud data of a power transmission line corridor is collected by the UAV, and then a mapping relationship between 2D image data and the 3D point cloud data is established; according to the mapping relationship, 3D point coordinates in a 3D space that correspond to a target object in the 2D image data are determined, so that a distance from the target object to the power transmission lines is calculated. The distance of the target object in the entire power transmission line corridor can be monitored through cameras, realizing all-weather, all-day monitoring for the power transmission lines.

EMBODIMENT 2

Figure 3:
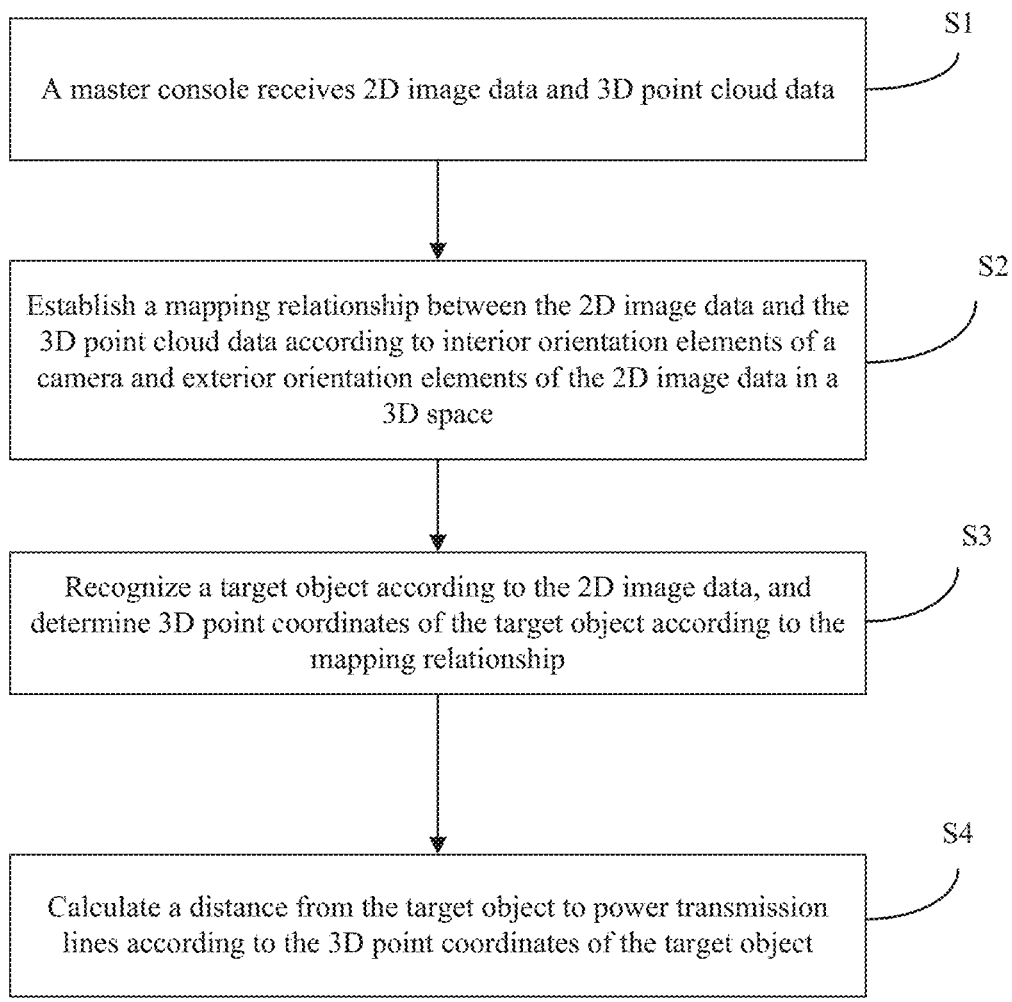
FIG. 3 is a flowchart diagram of an embodiment of a method for measuring an image distance of power transmission lines with a UAV according to the present disclosure.

Referring to FIG. 3, this embodiment provides a method for measuring an image distance of power transmission lines using the system of Embodiment 1, including the following steps:

S1: The master console receives 2D image data and 3D point cloud data.

S2: Establish a mapping relationship between the 2D image data and the 3D point cloud data according to interior orientation elements of the camera and exterior orientation elements of the 2D image data in a 3D space.

S3: Recognize a target object according to the 2D image data, and determine 3D point coordinates of the target object according to the mapping relationship.

S4: Calculate a distance from the target object to the power transmission lines according to the 3D point coordinates of the target object.

Specifically, in S1, the master console receives 2D image data sent by a camera connected thereto, and receives 3D point cloud data collected by the wireless communication module of the UAV. The UAV leaves the power transmission line corridor after collecting the 3D point cloud.

In S2, the establishing the mapping relationship between the 2D image data and the 3D point cloud data according to the interior orientation elements of the camera and the exterior orientation elements of the 2D image data in the 3D space includes the following steps:

S21: Select a first frame from the 2D image data as a background image.

S22: Select feature objects from the background image and the 3D point cloud data.

Specifically, the selected feature objects should exist in both the 2D image data returned by the camera and the 3D point cloud data scanned by the laser radar of the UAV. Moreover, positions and shapes of the feature objects in the scene are not changed. The selected feature objects should be unique and evenly distributed in the entire scene. Optionally, at least 3 sets of feature objects are selected. It may be understood that, to ensure the accuracy of the mapping relationship, as many as feature objects evenly distributed in the scene should be selected.

S23: Establish a transformation relationship between coordinates by the interior orientation elements of the camera, 2D pixel coordinates of the feature objects in the background image, and 3D space coordinates of the feature objects in the 3D point cloud data.

The transformation relationship is as follows:

$$\begin{bmatrix} u \\ v \\ 1 \end{bmatrix} = \begin{bmatrix} \frac{1}{d_x} & 0 & u_0 \\ 0 & \frac{1}{d_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} X_W \\ Y_W \\ Z_W \\ 1 \end{bmatrix}; \quad (1)$$

wherein $d_x$ and $d_y$ represent physical dimensions of each pixel on a horizontal axis x and a vertical axis y of the 2D image data, $(u_0, v_0)$ is pixel coordinates of an intersection between an optical axis of the camera and a 2D image data plane, f represents a focal length of the camera, (u, v) is 2D pixel coordinates, and $(X_w, Y_w, Z_w)$ is 3D space coordinates; R represents a rotation matrix between a 2D pixel coordinate system and a 3D space coordinate system, and T represents a translation vector from the 2D pixel coordinate system to the 3D space coordinate system; and The interior orientation elements of the camera include the pixel coordinates of the intersection between the optical axis of the camera and the 2D image data plane and the focal length of the camera.

S24: Calculate a rotation matrix and a translation vector in the transformation relationship.

S25: Calculate, according to the transformation relationship, 3D coordinates in the 3D point cloud data that correspond to coordinates of each pixel in the background image, and obtain a mapping relationship between the 2D image data and the 3D point cloud data.

So far, after the mapping relationship between the 2D image data and the 3D point cloud data is obtained, 3D coordinates of the target object can be calculated based on 2D image data collected by the camera in real time, thereby calculating an Euclidean distance between the target object and the power transmission lines.

Further, in S3, the determining the 3D point coordinates of the target object according to the mapping relationship includes:

selecting any pixel of the target object, and searching for 3D point coordinates corresponding to the pixel according to the mapping relationship.

In some embodiments, a Euclidean distance between two pixel points in the 2D image data can be calculated in the following manner: randomly selecting two pixel points, searching for 3D point coordinates corresponding to the two pixel points according to the mapping relationship, and calculating a Euclidean spatial distance according to the 3D point coordinate values, thus implementing measurement of a distance between two targets on an image.

A formula for calculating the Euclidean distance is as follows:

$$d=\sqrt{(X_{W2}-X_{W1})^2+(Y_{W2}-Y_{W1})^2+(Z_{W2}-Z_{W1})^2};\quad (2)$$

$(X_{w1}, Y_{W1}, Z_{W1})$ and $(X_{w2}, Y_{W2}, Z_{W2})$ are coordinates of two 3D points respectively, and d is a Euclidean distance.

In some embodiments, after the determining the 3D point coordinates of the target object according to the mapping relationship, the method further includes:

searching for 3D point coordinates of a power transmission line closest to the target object from the 3D point cloud data of the power transmission lines, and calculating a Euclidean distance from the target object to the closest power transmission line according to the 3D point coordinates of the target object and the 3D point coordinates of the closest power transmission line.

Figure 5:
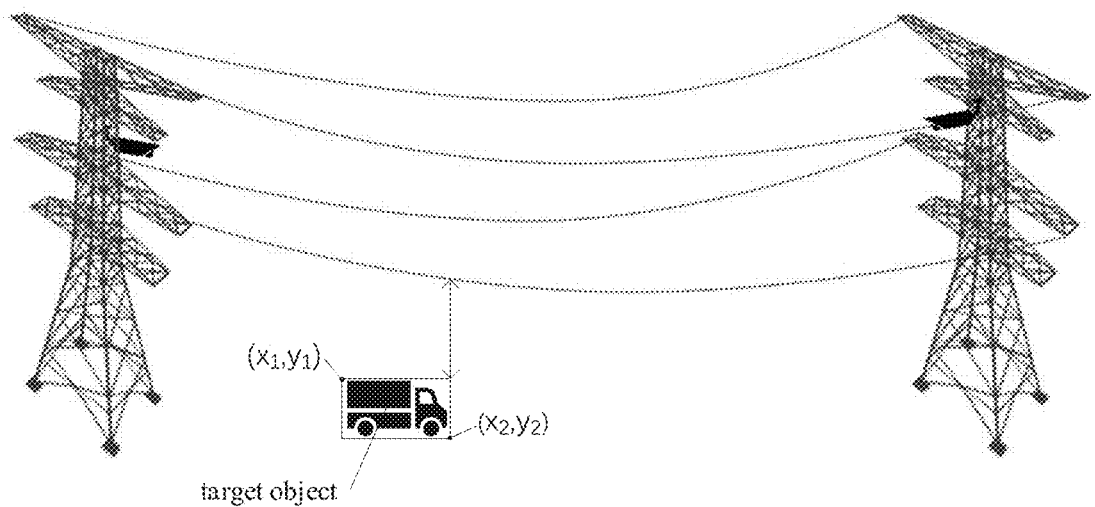
FIG. 5 is an example interface diagram of 2D image data in a system for measuring an image distance of power transmission lines with a UAV according to the present disclosure.

Further, referring to FIG. 5, after the recognizing the target object according to the 2D image data, the method further includes:

framing the target object with a box, and obtaining pixel coordinate values of any two diagonal angles of the box;

calculating a pixel coordinate value of another angle at the bottom of the box according to the pixel coordinate values of the two diagonal angles, obtaining 3D point coordinates corresponding to two base angles at the bottom of the box according the mapping relationship, and calculating a Euclidean distance between the two base angles;

dividing the Euclidean distance between the two base angles by a pixel distance between the two base angles, obtaining a space size corresponding to each pixel of the box, and calculating a spatial distance value between a top angle of the box and the base angle on the same side;

on the basis of the 3D point coordinates of the two base angles, adding the spatial distance value on the Z axis, to obtain 3D point coordinates of two top angles of the box; and calculating Euclidean distances from the two top angles to a 3D point of a closest power transmission line according to the 3D point coordinates of the two top angles respectively, and using a smaller distance value as a distance from the target object to the power transmission lines.

In the method for measuring an image distance of power transmission lines, a mapping relationship between 2D image data and 3D point cloud data is established, and according to the mapping relationship, 3D point coordinates in a 3D space that correspond to a target object in the 2D image data are determined, so that a distance from the target object to the power transmission lines is calculated with high accuracy. The distance of the target object in the entire power transmission line corridor can be monitored through cameras, realizing all-weather, all-day monitoring for the power transmission lines.

EMBODIMENT 3

Figure 4:
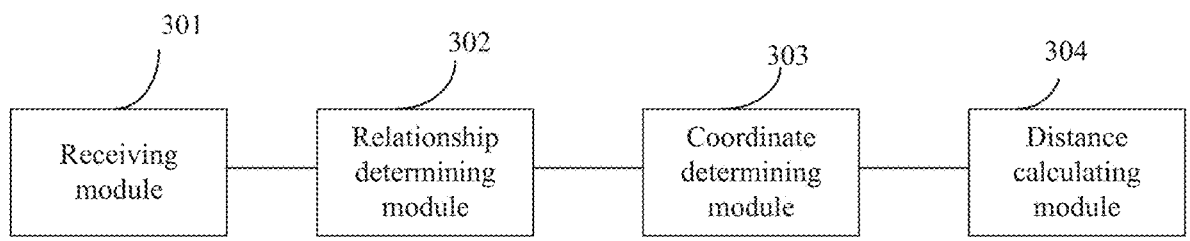
FIG. 4 is a schematic structural diagram of an embodiment of an apparatus for measuring an image distance of power transmission lines with a UAV according to the present disclosure.

Referring to FIG. 4, this embodiment provides an apparatus for measuring an image distance of power transmission lines with a UAV, including:

a receiving module 301, configured to receive 2D image data and 3D point cloud data;

A relationship determining module 302, configured to establish a mapping relationship between the 2D image data and the 3D point cloud data according to interior orientation elements of the camera and exterior orientation elements of the 2D image data in a 3D space;

a coordinate determining module 303, configured to recognize a target object according to the 2D image data, and determine 3D point coordinates of the target object according to the mapping relationship; and a distance calculating module 304, configured to calculate a distance from the target object to the power transmission lines according to the 3D point coordinates of the target object.

The establishing, by the relationship determining module 302, the mapping relationship between the 2D image data and the 3D point cloud data according to the interior orientation elements of the camera and the exterior orientation elements of the 2D image data in the 3D space includes:

selecting a first frame from the 2D image data as a background image;

selecting feature objects from the background image and the 3D point cloud data;

establishing a transformation relationship between coordinates by the interior orientation elements of the camera, 2D pixel coordinates of the feature objects in the background image, and 3D space coordinates of the feature objects in the 3D point cloud data;

calculating a rotation matrix and a translation vector in the transformation relationship; and calculating, according to the transformation relationship, 3D coordinates in the 3D point cloud data that correspond to coordinates of each pixel in the background image, and obtaining a mapping relationship between the 2D image data and the 3D point cloud data.

The transformation relationship is as shown in formula (1).

The determining, by the coordinate determining module 303, the 3D point coordinates of the target object according to the mapping relationship includes:

selecting any pixel of the target object, and searching for 3D point coordinates corresponding to the pixel according to the mapping relationship.

Further, the distance calculating module 304 is further configured to search for 3D point coordinates of a power transmission line closest to the target object from the 3D point cloud data of the power transmission lines, and calculate a Euclidean distance from the target object to the closest power transmission line according to the 3D point coordinates of the target object and the 3D point coordinates of the closest power transmission line.

A formula for calculating the Euclidean distance is as in formula (2).

The distance calculating module 304 is further configured to:

frame the target object with a box, and obtaining pixel coordinate values of any two diagonal angles of the box;

calculate a pixel coordinate value of another angle at the bottom of the box according to the pixel coordinate values of the two diagonal angles, obtain 3D point coordinates corresponding to two base angles at the bottom of the box according the mapping relationship, and calculate a Euclidean distance between the two base angles;

divide the Euclidean distance between the two base angles by a pixel distance between the two base angles, obtain a space size corresponding to each pixel of the box, and calculate a spatial distance value between a top angle of the box and the base angle on the same side;

on the basis of the 3D point coordinates of the two base angles, add the spatial distance value on the Z axis, to obtain 3D point coordinates of two top angles of the box; and calculate Euclidean distances from the two top angles to a 3D point of a closest power transmission line according to the 3D point coordinates of the two top angles respectively, and use a smaller distance value as a distance from the target object to the power transmission lines.

In another embodiment, an apparatus for measuring an image distance of power transmission lines with a UAV includes: a processor, wherein the processor is configured to execute the foregoing program modules stored in a memory, including: the receiving module 301, the relationship determining module 302, the coordinate determining module 303, and the distance calculating module 304.

In the apparatus for measuring an image distance of power transmission lines, a mapping relationship between 2D image data and 3D point cloud data is established, and according to the mapping relationship, 3D point coordinates in a 3D space that correspond to a target object in the 2D image data are determined, so that a distance from the target object to the power transmission lines is calculated with high accuracy. The distance of the target object in the entire power transmission line corridor can be monitored through cameras, realizing all-weather, all-day monitoring for the power transmission lines.

Although preferred embodiments of the present disclosure have been described, those skilled in the art can make additional alterations and modifications to these embodiments once they learn the basic inventive concept. Therefore, the appended claims are intended to be interpreted as including the preferred embodiments and all alterations and modifications falling within the scope of the present disclosure. Obviously, those skilled in the art can make various alterations and modifications to the present disclosure without departing from the spirit and scope of the present disclosure. The present disclosure is intended to cover these modifications and variations provided that they fall within the scope of protection defined by the following claims and their equivalent technologies.

The invention claimed is:

1. A system for measuring an image distance of power transmission lines with an unmanned aerial vehicle (UAV), wherein the power transmission lines comprise a plurality of electrical power towers and a power transmission line corridor between adjacent electrical power towers, and the system comprises a UAV, a master console, and a plurality of cameras;

the cameras are fixed on the electrical power towers, and are configured to collect two-dimensional (2D) image data of the power transmission line corridor;

the UAV comprises a vehicle body, a lidar device, a rotor assembly, a power unit, a flight control processor, a state detection device, and a wireless communication module;

the state detection device is configured to acquire positioning information of the state detection device, collect distance information between the UAV and ground, and send the positioning information and the distance information to the flight control processor; the flight control processor is configured to generate a control signal according to the distance information and the positioning information, and control, according to the control signal, the power unit to adjust a flight track and a flight height of the UAV; the lidar device is configured to collect three-dimensional (3D) point cloud data of the power transmission lines, wherein the 3D point cloud data is sent to the master console through the wireless communication module;

the master console is configured to receive the 2D image data and the 3D point cloud data, and establish a mapping relationship between the 2D image data and the 3D point cloud data according to interior orientation elements of the camera and exterior orientation elements of the 2D image data in a 3D space; recognize a target object according to the 2D image data, determine 3D point coordinates of the target object according to the mapping relationship, and calculate a distance from the target object to the power transmission lines according to the 3D point coordinates of the target object; and after recognizing the target object according to the 2D image data, the master console is further configured to perform the following operations:

framing the target object of the 2D image data with a rectangular shape, and obtaining pixel coordinate values of any two diagonal corners of the rectangular shape;

calculating a pixel coordinate value of another corner at the bottom of the rectangular shape according to the pixel coordinate values of the two diagonal corners, obtaining 3D point coordinates corresponding to two base corners at the bottom of the rectangular shape according to the mapping relationship, and calculating a Euclidean spatial distance between the two base corners; wherein the mapping relationship is as follows:

$$\begin{bmatrix} u \\ v \\ 1 \end{bmatrix} = \begin{bmatrix} \frac{1}{d_x} & 0 & u_0 \\ 0 & \frac{1}{d_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} X_W \\ Y_W \\ Z_W \\ 1 \end{bmatrix}$$

wherein $d_x$ and $d_y$ represent physical dimensions of each pixel on a horizontal axis x and a vertical axis y of the 2D image data, $(u_0, v_0)$ is pixel coordinates of an intersection between an optical axis of the camera and a 2D image data plane, f represents a focal length of the camera, (u, v) is 2D pixel coordinates, and $(X_W, Y_W, Z_W)$ is 3D space coordinates; R represents a rotation matrix between a 2D pixel coordinate system and a 3D space coordinate system, and T represents a translation vector from the 2D pixel coordinate system to the 3D space coordinate system; and the interior orientation elements of the camera comprise the pixel coordinates of the intersection between the optical axis of the camera and the 2D image data plane and the focal length of the camera;

dividing the Euclidean spatial distance between the two base corners by a pixel distance between the two base corners, obtaining a space size corresponding to each pixel of the rectangular shape, and calculating a spatial distance value between a top corner of the rectangular shape and the base corner on the same side;

on the basis of the 3D point coordinates of the two base corners, adding the spatial distance value on the Z axis of the 3D space coordinate system, to obtain 3D point coordinates of two top corners of the rectangular shape; and calculating Euclidean spatial distances from the two top corner to a 3D point of a closest power transmission line according to the 3D point coordinates of the two top corners respectively, and using a smaller distance value as a distance from the target object to the power transmission lines.

2. The system for measuring an image distance of power transmission lines with a UAV according to claim 1, wherein the state detection device comprises a global positioning system (GPS) positioning device and a laser ranging radar, the GPS positioning device is configured to acquire positioning information of the UAV, and the laser ranging radar is configured to detect a height from the UAV to the ground.

3. The system for measuring an image distance of power transmission lines with a UAV according to claim 1, wherein a width of the power transmission line corridor is greater than or equal to 50 meters.

4. The system for measuring an image distance of power transmission lines with a UAV according to claim 1, wherein the flight control processor is further configured to receive, through the wireless communication module, a ground control signal sent by the master console, and control, according to the ground control signal, the power unit to adjust the flight track and the flight height of the UAV, wherein a priority of the ground control signal is higher than that of the control signal.

5. A method for measuring an image distance of power transmission lines, applied to a system for measuring an image distance of power transmission lines with a UAV, wherein the method comprises the following steps:

receiving, by the master console, 2D image data and 3D point cloud data;

establishing a mapping relationship between the 2D image data and the 3D point cloud data according to interior orientation elements of the camera and exterior orientation elements of the 2D image data in a 3D space;

recognizing a target object according to the 2D image data, and determining 3D point coordinates of the target object according to the mapping relationship; and calculating a distance from the target object to the power transmission lines according to the 3D point coordinates of the target object; and after recognizing the target object according to the 2D image data, the method further comprises:

framing the target object of the 2D image data with a rectangular shape, and obtaining pixel coordinate values of any two diagonal corners of the rectangular shape;

calculating a pixel coordinate value of another corner at the bottom of the rectangular shape according to the pixel coordinate values of the two diagonal corners, obtaining 3D point coordinates corresponding to two base corners at the bottom of the rectangular shape according the mapping relationship, and calculating a Euclidean spatial distance between the two base corners;

dividing the Euclidean spatial distance between the two base corners by a pixel distance between the two base corners, obtaining a space size corresponding to each pixel of the rectangular shape, and calculating a spatial distance value between a top corner of the rectangular shape and the base corner on the same side;

on the basis of the 3D point coordinates of the two base corners, adding the spatial distance value on the Z axis of a 3D space coordinate system, to obtain 3D point coordinates of two top corners of the rectangular shape; and calculating Euclidean spatial distances from the two top corners to a 3D point of a closest power transmission line according to the 3D point coordinates of the two top corners respectively, and using a smaller distance value as a distance from the target object to the power transmission lines;

wherein the establishing the mapping relationship between the 2D image data and the 3D point cloud data according to the interior orientation elements of the camera and the exterior orientation elements of the 2D image data in the 3D space comprises:

selecting a first frame from the 2D image data as a background image;

selecting feature objects from the background image and the 3D point cloud data;

establishing a transformation relationship between coordinates by the interior orientation elements of the camera, 2D pixel coordinates of the feature objects in the background image, and 3D space coordinates of the feature objects in the 3D point cloud data;

calculating a rotation matrix and a translation vector in the transformation relationship; and calculating, according to the transformation relationship, 3D coordinates in the 3D point cloud data that correspond to coordinates of each pixel in the background image, and obtaining a mapping relationship between the 2D image data and the 3D point cloud data;

wherein the transformation relationship is as follows:

$$\begin{bmatrix} u \\ v \\ 1 \end{bmatrix} = \begin{bmatrix} \frac{1}{d_x} & 0 & u_0 \\ 0 & \frac{1}{d_y} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ 0 & 1 \end{bmatrix} \begin{bmatrix} X_W \\ Y_W \\ Z_W \\ 1 \end{bmatrix}$$

wherein $d_x$ and $d_y$ represent physical dimensions of each pixel on a horizontal axis x and a vertical axis y of the 2D image data, $(u_0, v_0)$ is pixel coordinates of an intersection between an optical axis of the camera and a 2D image data plane, f represents a focal length of the camera, (u, v) is 2D pixel coordinates, and $(X_W, Y_W, Z_W)$ is 3D space coordinates; R represents a rotation matrix between a 2D pixel coordinate system and a 3D space coordinate system, and T represents a translation vector from the 2D pixel coordinate system to the 3D space coordinate system; and the interior orientation elements of the camera comprise the pixel coordinates of the intersection between the optical axis of the camera and the 2D image data plane and the focal length of the camera $(X_W, Y_W, Z_W)$.

6. The method for measuring an image distance of power transmission lines according to claim 5, wherein the establishing the mapping relationship between the 2D image data and the 3D point cloud data according to the interior orientation elements of the camera and the exterior orientation elements of the 2D image data in the 3D space comprises:

selecting a first frame from the 2D image data as a background image;

selecting feature objects from the background image and the 3D point cloud data;

establishing a transformation relationship between coordinates by the interior orientation elements of the camera, 2D pixel coordinates of the feature objects in the background image, and 3D space coordinates of the feature objects in the 3D point cloud data;

calculating a rotation matrix and a translation vector in the transformation relationship; and calculating, according to the transformation relationship, 3D coordinates in the 3D point cloud data that correspond to coordinates of each pixel in the background image, and obtaining a mapping relationship between the 2D image data and the 3D point cloud data.

7. The method for measuring an image distance of power transmission lines according to claim 5, wherein the determining the 3D point coordinates of the target object according to the mapping relationship comprises:

selecting any pixel of the target object, and searching for 3D point coordinates corresponding to the pixel according to the mapping relationship.

8. The method for measuring an image distance of power transmission lines according to claim 7, wherein after the determining the 3D point coordinates of the target object according to the mapping relationship, the method further comprises:

searching for 3D point coordinates of a power transmission line closest to the target object from the 3D point cloud data of the power transmission lines, and calculating a Euclidean distance from the target object to the closest power transmission line according to the 3D point coordinates of the target object and the 3D point coordinates of the closest power transmission line.

* * * * *